(12) United States Patent
Mullen et al.

(10) Patent No.: US 7,323,536 B2
(45) Date of Patent: Jan. 29, 2008

(54) TRANSPARENT COMPOSITIONS, METHODS FOR THE PREPARATION THEREOF, AND ARTICLES DERIVED THEREFROM

(75) Inventors: Brian D. Mullen, Mt. Vernon, IN (US); Paul D. Sybert, Evansville, IN (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 11/267,743

(22) Filed: Nov. 4, 2005

(65) Prior Publication Data

US 2006/0264582 A1 Nov. 23, 2006

Related U.S. Application Data

(63) Continuation-in-part of application No. 11/134,495, filed on May 20, 2005.

(51) Int. Cl.
*C08G 64/00* (2006.01)
(52) U.S. Cl. .................. 528/196; 264/176.1; 264/219; 502/208; 528/198; 528/271; 528/272
(58) Field of Classification Search ............. 264/176.1, 264/219; 502/208; 528/196, 198, 271, 272
See application file for complete search history.

(56) References Cited

U.S. PATENT DOCUMENTS

| | | | |
|---|---|---|---|
| 3,030,331 A | 4/1962 | Goldberg | |
| 3,169,121 A | 2/1965 | Goldberg | |
| 3,207,814 A | 9/1965 | Goldberg | |
| 3,444,129 A | 5/1969 | Young et al. | |
| 3,460,961 A | 8/1969 | Young et al. | |
| 3,492,261 A | 1/1970 | Young et al. | |
| 3,503,779 A | 3/1970 | Young et al. | |
| 3,506,470 A | 4/1970 | Young et al. | |
| 4,127,560 A | 11/1978 | Kramer | |
| 4,156,069 A | 5/1979 | Prevorsek et al. | |
| 4,194,038 A | 3/1980 | Baker et al. | |
| 4,217,438 A | 8/1980 | Brunelle et al. | |
| 4,219,635 A | 8/1980 | Cooke et al. | |
| 4,238,596 A | 12/1980 | Quinn | |
| 4,238,597 A | 12/1980 | Markezich et al. | |
| 4,281,009 A | 7/1981 | Konishi | |
| 4,286,083 A | 8/1981 | Kochanowski | |
| 4,308,406 A | 12/1981 | Takenaka et al. | |
| 4,334,093 A | 6/1982 | Knifton | |
| 4,414,230 A | 11/1983 | Hanabata et al. | |
| 4,487,896 A | 12/1984 | Mark et al. | |
| 4,495,325 A | 1/1985 | DeBergails et al. | |
| 4,506,065 A | 3/1985 | Miller et al. | |
| 4,617,368 A | 10/1986 | Freitag et al. | |
| 4,973,652 A | 11/1990 | Ebert et al. | |
| 4,992,322 A | 2/1991 | Curry et al. | |
| 4,994,532 A | 2/1991 | Hawkins et al. | |
| 5,321,114 A | 6/1994 | Fontana et al. | |
| 5,414,057 A | 5/1995 | Campbell et al. | |
| 5,510,414 A | 4/1996 | Okamoto et al. | |
| 5,521,230 A | 5/1996 | Bhatia et al. | |
| 5,652,312 A | 7/1997 | Phelps et al. | |
| 5,777,064 A * | 7/1998 | Hayashi et al. ............. 528/196 |
| 5,821,322 A | 10/1998 | Brunelle et al. | |
| 5,886,073 A | 3/1999 | McCloskey et al. | |
| 5,916,997 A | 6/1999 | Webb et al. | |
| 5,932,677 A | 8/1999 | Hoover et al. | |
| 5,986,019 A | 11/1999 | Archey et al. | |
| 6,048,947 A | 4/2000 | Oberhoffner et al. | |
| 6,143,839 A | 11/2000 | Webb et al. | |
| 6,252,013 B1 | 6/2001 | Banach et al. | |
| 6,294,647 B1 | 9/2001 | Brunelle et al. | |
| 6,306,507 B1 | 10/2001 | Brunelle et al. | |
| 6,346,597 B1 | 2/2002 | Banach et al. | |
| 6,492,485 B1 | 12/2002 | Gohr et al. | |
| 6,506,871 B1 | 1/2003 | Silvi et al. | |
| 6,559,270 B1 | 5/2003 | Siclovan et al. | |
| 6,572,956 B1 | 6/2003 | Pickett et al. | |
| 6,607,814 B2 | 8/2003 | Pickett et al. | |
| 6,610,409 B2 | 8/2003 | Pickett et al. | |
| 6,790,929 B2 | 9/2004 | Silvi et al. | |
| 2001/0016626 A1 | 8/2001 | Vollenberg et al. | |
| 2003/0195295 A1 | 10/2003 | Mahood et al. | |
| 2003/0207123 A1 | 11/2003 | Brunelle et al. | |
| 2004/0127633 A1 | 7/2004 | Guth et al. | |
| 2004/0127653 A1 | 7/2004 | Ellington et al. | |
| 2005/0049369 A1 | 3/2005 | O'Neil et al. | |

FOREIGN PATENT DOCUMENTS

| | | |
|---|---|---|
| EP | 0186917 | 1/1989 |
| EP | 0736558 A2 | 10/1996 |
| WO | WO 00/26275 | 5/2000 |
| WO | WO 03/010220 A1 | 2/2003 |

OTHER PUBLICATIONS

ASTM D1003-00. "Standard Test Method for Haze and Luminous Transmittance of Transparent Plastics". pp. 1-6.
PCT International Search Report for International Application No. PCT/US2006/016977.
PCT International Search Report for International Application No. PCT/US2006/016857.
PCT International Search Report for International Application No. PCT/US2006/017229.

* cited by examiner

*Primary Examiner*—Terressa Boykin

(57) ABSTRACT

A reaction product comprises a polyester-polycarbonate comprising a polyester unit and a polycarbonate unit, and a transesterification catalyst. The reaction product has a haze of less than 5.0%, specifically less than 3.5% as measured at a thickness of 3.2 mm according to ASTM D1003-00. A thermoplastic composition comprising the reaction product and articles formed from therefrom are disclosed. A method of forming the reaction product is also disclosed.

25 Claims, 2 Drawing Sheets

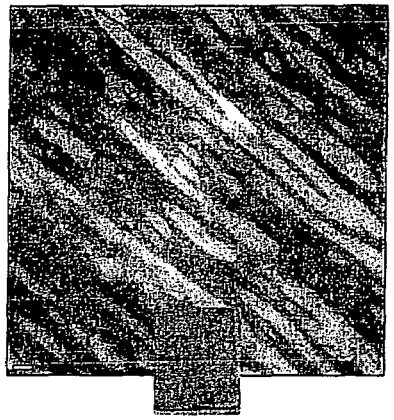
Figure 1. Blend of polyester polycarbonate and polycarbonate without transesterification catalyst.
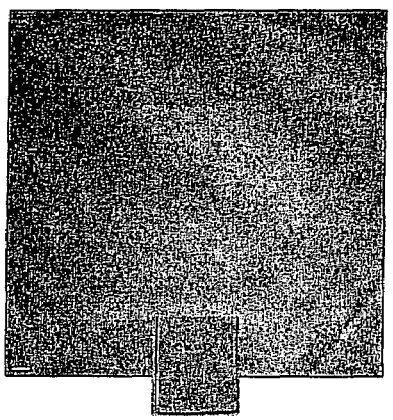
Figure 2. Blend of polyester polycarbonate and polycarbonate with transesterification catalyst.

Ex. 9　　　　　　　　CEx. 11

TRANSPARENT COMPOSITIONS, METHODS FOR THE PREPARATION THEREOF, AND ARTICLES DERIVED THEREFROM

CROSS REFERENCE TO RELATED APPLICATIONS

This application is a continuation-in-part of U.S. application Ser. No. 11/134,495, filed May 20, 2005.

BACKGROUND OF THE INVENTION

This disclosure relates to polyester-polycarbonate compositions, methods of manufacture, and uses thereof.

Polycarbonates and polyester-polycarbonates are useful in the manufacture of articles and components for a wide range of applications, from automotive parts to electronic appliances. Because of their broad use, particularly in electronic applications or visually oriented applications such as light covers, see-through protective coverings, lenses, and transparent films, it is desirable to provide polycarbonates and polyester polycarbonates with excellent weatherability, impact strength, and both surface finish and optical clarity. Some of these properties can be provided by combining a polyester or polyester-polycarbonate with polycarbonates, but it has been difficult to obtain optically clear compositions that have the desired combinations of properties.

There accordingly remains a need in the art for polyester-polycarbonate resin compositions that possess extremely low haze without having a detrimental effect on impact strength, weatherability, and/or melt flow properties. Further, the preparation of such compositions from inexpensive polymer feedstock is desired.

SUMMARY OF THE INVENTION

A first embodiment comprises a reaction product obtained by melt blending a combination comprising a first polymer comprising
aromatic ester units having the formula

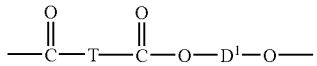

wherein T is a divalent aromatic radical and $D^1$ is a divalent aromatic radical, and
carbonate units having the formula

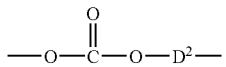

wherein at least 60% of the total number of $D^2$ groups are divalent aromatic radicals and the balance thereof are divalent aliphatic, alicyclic, or aromatic radicals;
a second polymer comprising carbonate units having the formula

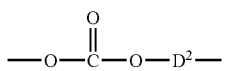

wherein at least 60% of the total number of $D^2$ groups are divalent aromatic radicals and the balance thereof are divalent aliphatic, alicyclic, or aromatic radicals; and
a transesterification catalyst, wherein the reaction product has a haze of less than 1.7%, measured at a thickness of 3.2 mm according to ASTM D1003-00, and wherein the first and second polymers are selected such that, in the absence of the transesterification catalyst, the similarly melt blended combination would have a haze of greater than 1.7% measured at a thickness of 3.2 mm according to ASTM D1003-00.

In another embodiment, a method of manufacture of a reaction product comprises melt blending the above-described combination under conditions effective to provide the reaction product of a polyester-polycarbonate, a polycarbonate, and a transesterification catalyst, wherein the reaction product has a haze of less than 1.7%, measured at a thickness of 3.2 mm according to ASTM D1003-00, and wherein the first and second polymers are selected such that, in the absence of the transesterification catalyst, the similarly melt blended combination of polymers would have a haze of greater than 1.7% measured at a thickness of 3.2 mm according to ASTM D1003-00.

In another embodiment, a thermoplastic composition comprises the above-described reaction product.

In another embodiment, an article comprises the above-described thermoplastic composition.

Another embodiment comprises a reaction product obtained by melt blending a combination comprising a polymer comprising
aromatic ester units having the formula

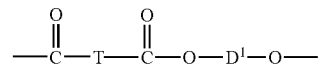

wherein T is a divalent aromatic radical and $D^1$ is a divalent aromatic radical, and
carbonate units having the formula

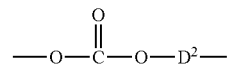

wherein at least 60% of the total number of $D^2$ groups are divalent aromatic radicals and the balance thereof are divalent aliphatic, alicyclic, or aromatic radicals; and
a transesterification catalyst,
wherein the reaction product is a polymer selected such that, in the absence of the transesterification catalyst, the similarly melt blended polymer would have a haze of greater than 5.0%, more specifically, greater than 3.5%, measured at a thickness of 3.2 mm according to ASTM D1003-00.

In another embodiment, a thermoplastic composition comprises the above-described reaction product.

In another embodiment, an article comprises the above-described thermoplastic composition.

BRIEF DESCRIPTION OF THE FIGURES

FIG. 1 is a transmission electron microscope (TEM) image of a polyester-polycarbonate—polycarbonate composition without a transesterification catalyst present.

FIG. 2 is a TEM image of a polyester-polycarbonate—polycarbonate composition having a transesterification catalyst present.

DETAILED DESCRIPTION OF THE INVENTION

Figure 3:
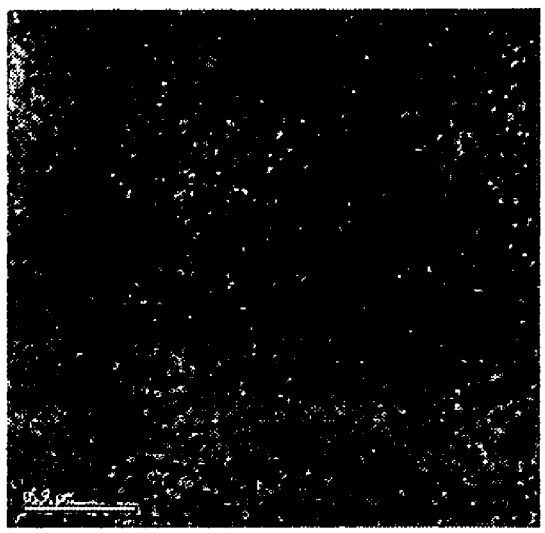
FIG. 3 is a TEM image of a polyester-polycarbonate composition with a transesterification catalyst present.

It has surprisingly been found by the inventors hereof that use of small amounts of a transesterification catalyst during the melt-blending of a polycarbonate and a polyester-polycarbonate can substantially eliminate the formation of phase-separated regions in highly immiscible blends of polyester-polycarbonates with polycarbonates. An optically clear thermoplastic composition having excellent physical properties, particularly weatherability, can now be obtained using the reaction product of polycarbonates and polyester-polycarbonates with a transesterification catalyst. Such reaction products have very low haze, that is, haze of less than 1.7% measured according to the method of ASTM D1003-00.

It has also surprisingly been found by the inventors hereof that use of small amounts of a transesterification catalyst during the melt-processing of a polyester-polycarbonate can substantially eliminate the formation of phase-separated regions in highly immiscible systems which have a separate polyester or polyester rich phase and a separate, distinct polycarbonate or polycarbonate rich phase within the same polymer resin. An optically clear thermoplastic composition having excellent physical properties, particularly weatherability, can now be obtained using the reaction product of polyester-polycarbonates with a transesterification catalyst. Such reaction products have very low haze, that is, haze of less than 5.0% measured according to the method of ASTM D1003-00.

As used herein, the terms "polycarbonate" and "polycarbonate resin" mean compositions having repeating structural carbonate units of the formula (1):

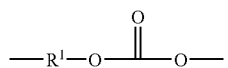

in which at least about 60 percent of the total number of $R^1$ groups are aromatic radicals and the balance thereof are aliphatic, alicyclic, or aromatic radicals. In one embodiment, each $R^1$ is an aromatic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative, non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexy-lidene, or isopropylidene. Combinations of polycarbonates may also be used. As used herein, a "combination" is inclusive of all mixtures, blends, alloys, and the like.

Polycarbonates may be produced by the interfacial reaction of dihydroxy compounds having the formula HO—$R^1$—OH, which includes dihydroxy compounds of formula (3):

$$HO-A^1-Y^1-A^2-OH \quad (3)$$

wherein $Y^1$, $A^1$ and $A^2$ are as described above. Also included are bisphenol compounds of general formula (4):

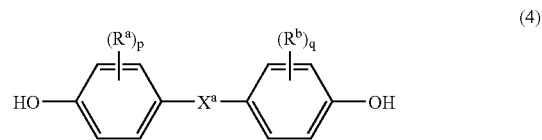

wherein $R^a$ and $R^b$ each represent a halogen atom or a monovalent hydrocarbon group and may be the same or different; p and q are each independently integers of 0 to 4; and $X^a$ represents a bond directly linking the aryl radicals, or a linking group that includes one of the groups of formula (5):

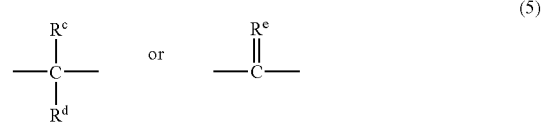

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6- bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl )sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl)n-butane, 2,2-bis(4-hydroxy-1-methylphenyl) propane, and 1,1-bis(4-hydroxy-t-butylphenyl) propane. Combinations comprising at least one of the foregoing dihydroxy compounds may also be used.

Branched polycarbonates are also useful, as well as combinations of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethyl benzyl) phenol), 4-chloroformyl phthalic anhydride, trimesic acid, and benzophenone tetracarboxylic acid. The branching agents may be added at a level of about 0.05-2.0 wt. %. All types of polycarbonate end groups are contemplated as being useful in the polycarbonate composition, provided that such end groups do not significantly affect desired properties of the thermoplastic compositions.

In a specific embodiment, a polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per grain (dl/g), specifically about 0.45 to about 1.0 dl/g. The polycarbonates may have a weight average molecular weight of about 10,000 to about 200,000, specifically about 15,000 to about 100,000, more specifically about 17,000 to about 50,000, as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min.

In one embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300° C./1.2 kg, of 1 to 70 grams per 10 minutes (g/10 min), specifically 2 to 30 g/10 min. Mixtures of polycarbonates of different flow properties may be used to achieve the overall desired flow property. The polycarbonate has a haze less than 10%, specifically less than or equal to 5%, and in some cases, more specifically less than or equal to 1.7%, as measured at a thickness of 3.2 mm according to ASTM D1003-00. The polycarbonate may further have a light transmission greater than or equal to 70%, specifically greater than or equal to 80% and more specifically greater than or equal to 85%, as measured at a thickness of 3.2 mm according to ASTM D1003-00.

The polycarbonates are blended with polyester-polycarbonate, also known as a copolyester-polycarbonate or polyester carbonate. Such copolymers further contain, in addition to recurring carbonate chain units of the formula (1), repeating units of formula (6)

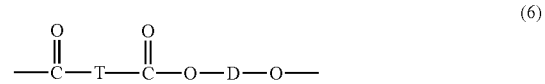

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:9 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

The polyester-polycarbonates further comprise carbonate units as described herein above. Carbonate units of formula (1) may also be derived from aromatic dihydroxy compounds of formula (7), wherein specific carbonate units are resorcinol carbonate units. It will be understood that the term "carbonate unit", as used herein, comprises one or more different types of carbonate unit. A polyester-polycarbonate may thus comprise more than one type of polycarbonate.

The ratio of ester units to carbonate units in the copolymers may vary broadly, for example 99 to 1 mole-percent (mole %) ester units and 1 to 99 mole % carbonate units, depending on the desired properties of the final composition. The copolymers contain in one embodiment 5 to 95 mole % ester blocks, specifically 10 to 90 mole % ester blocks, and more specifically 15 to 85 mole % ester blocks.

In an embodiment, the polyester unit of a polyester-polycarbonate is derived from the reaction of a combination of isophthalic and terephthalic diacids (or derivatives thereof) with resorcinol, wherein the molar ratio of isophthalate units to terephthalate units is 91:9 to 98:1, specifically 85:15 to 3:97, more specifically 80:20 to 5:95, and still more specifically 70:30 to 10:90. In an embodiment, the polycarbonate units are derived from resorcinol and bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate is 5:95 to 95:5, specifically 10:90 to 90:10, more specifically 15:85 to 85:15.

While it is not required to provide an explanation of how an invention works, such theories may be useful to for the purposes of better helping the reader to comprehend the invention. Thus, it is to be understood that the claims are not to be limited by the following theory of operation. It is believed that on a molecular scale both the transparency and haze of the polyester-polycarbonate are related to the number of polyester units within the polymer chain, the average size of the polyester unit (as defined by the number of repeating polyester subunits), the random or non-random distribution of the polyester units in the polymer chain, or a combination of one or more of these factors. It is believed that a more random distribution of polyester units within a copolymer provides both a greater degree of transparency and a lesser degree of haze. Reaction conditions, relative amounts of starting materials, and/or types of starting materials may therefore be selected so as to adjust the distribution of the polyester units, and thus the transparency and haze of the polyester-polycarbonate. Random distribution of polyester units in a polyester-polycarbonate can be achieved during interfacial polymerization such as that described in International Patent Application WO 00/26275 to Siclovan et. al., wherein hydroxy terminated polyester blocks with a relatively low number of repeating units (e.g., preferably 30 to 150) are formed at an earlier stage of the polymerization, and are subsequently copolymerized at a later stage of the polymerization with an aromatic dihydroxy compound and phosgene to form polycarbonate blocks having a preferred degree of polymerization of 20 to 200. Thus, randomness is increased where the molecular weight of the blocks comprised of polyester units is relatively low in such compositions. The stoichiometry of the aromatic dicarboxylic acid dichloride and the dihydroxy aromatic compound, i.e. use of an excess of dihydroxy aromatic compound, and/or the presence of a chain stopper during polymerization, and/or a combination of these, are each useful in limiting the size of the polyester blocks. Phase transfer catalyst concentration during ester synthesis, i.e., use of lower amounts of the catalyst, lower reaction concentration, or lower temperatures can also be used to limit the growth of blocks of polyester units.

In one embodiment, polyester-polycarbonates as used herein are weatherable compositions comprising resorcinol ester units as shown, for example, in formula (8). It is known in the art that exposure of isophthalate-terephthalate esters such as (8) to ultraviolet radiation can cause a photochemically induced rearrangement known as a Photo-Fries rearrangement, to form the 2-hydroxy benzophenone of formula (9), which acts as an ultraviolet stabilizer. Compositions comprising resorcinol ester units undergo Photo-Fries rearrangements below the surface of the composition slowly, and so are resistant to weathering and are suitable for use in the thermoplastic compositions disclosed herein.

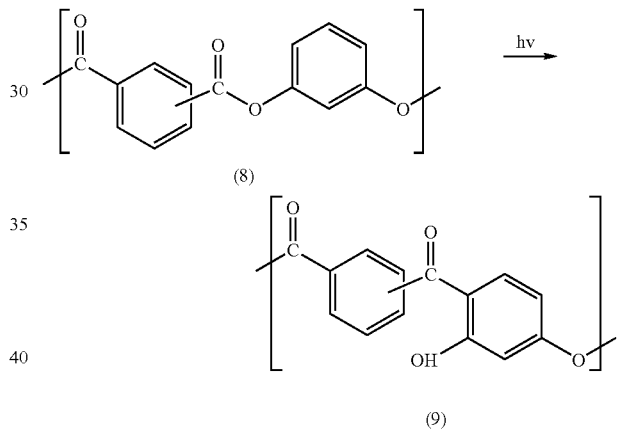

A Polyester unit comprising a bisphenol A ester unit, as in, for example, formula (10), also undergoes Photo-Fries rearrangement to form the corresponding 2-hydroxy benzophenone having formula (11). This results in the formation of a UV stabilizer wherein the increased degree of pi-electron conjugation shifts light absorbance such that there is more transmission in the visible region of the spectrum, creating an observable yellow color. Hence, a stronger yellow color as measured using the yellowing index ("YI") can develop in the thermoplastic composition in a shorter time frame. It is therefore desirable to minimize the number of bisphenol A ester units present in weatherable polyester-polycarbonates and articles derived therefrom.

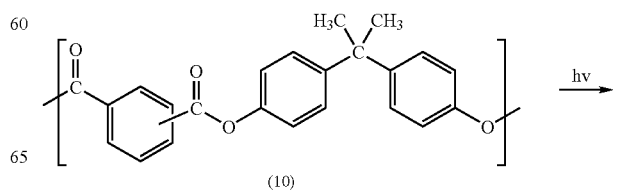

-continued

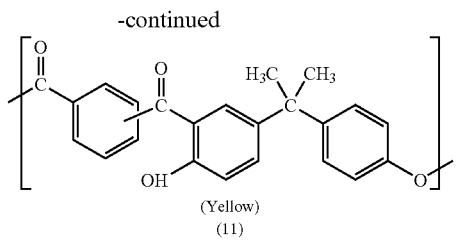

(Yellow)
(11)

Limiting the number of bisphenol-A ester linkages (10) in weatherable polyester-polycarbonates to maintain weatherability, can be achieved by limiting the number of reactive end groups in the polyester unit, such as carboxylic acid chloride end groups, that can react with the dihydroxy aromatic compounds used in the formation of the polycarbonate units during interfacial polymerization. Specifically, when the polycarbonate unit is the reaction product of bisphenol-A, the bisphenol-A can react with carboxylic acid chloride groups in the polyester unit to form bisphenol-A-polyester bonds. Use of excess of the desired dihydroxy aromatic compound, such as a resorcinol, for the polyester unit during interfacial polymerization, as described in International Patent Application WO 00/26275 to Siclovan et. al., provides blocks of dihydroxy terminated polyester units with minimal tree reactive carboxylic acid chloride end groups, thus minimizing the formation of undesirable polyester linkages of structure (10) during subsequent formation of polycarbonate units.

The polyester-polycarbonates, as used herein, may have a weight-averaged molecular weight (Mw) of 1,500 to 200,000, specifically 3000 to 100,000, and more specifically 5,000 to 80,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 18 ml/min.

In one embodiment, the polyester-polycarbonate has a melt volume flow rate (often abbreviated MVR), measured at 300° C./1.2 kg, of 1 to 70 grams per 10 minutes (g/10 min), specifically 2 to 50 g/10 min. Mixtures of polyester-polycarbonates of different flow properties may be used to achieve the overall desired flow property. The polyester-polycarbonate has a haze less than 10%, specifically less than or equal to 5%, and more specifically less than or equal to 3.5%, as measured at a thickness of 3.2 mm according to ASTM D1003-00. The polyester-polycarbonate may further have a light transmission greater than or equal to 70%, specifically greater than or equal to 80% and more specifically greater than or equal to 85%, as measured at a thickness of 3.2 mm according to ASTM D1003-00.

Suitable polycarbonates and polyester-polycarbonates can be manufactured by processes such as interfacial polymerization and melt polymerization. Although the reaction conditions for interfacial polymerization may vary, an exemplary process generally involves dissolving or dispersing a dihydric phenol reactant and chain stopper in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinione, or the like) or a glycol (e.g., the bishaloformate of ethylene glycol, neopentyl glycol, polyethylene glycol, or the like). Combinations comprising at least one of the foregoing types of carbonate precursors may also be used.

A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride, and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used to make the polycarbonates and polyester-polycarbonates. Generally, in the melt polymerization process, polycarbonates may be prepared by co-reacting, in a molten state, the dihydroxy reactant(s) and a diaryl carbonate ester, such as diphenyl carbonate or an activated carbonate, such as bis(methylsalicyl)carbonate (BMSC), in the presence of a transesterification catalyst in a Banbury™ mixer, twin screw extruder, or the like to form a uniform dispersion. Volatile monohydric phenol is removed from the molten reactants by distillation and the polymer is isolated as a molten residue.

Without wishing to be bound by theory, the reaction product described herein is a reactive melt processed product of a polyester-polycarbonate, which contains a polyester rich phase and a polycarbonate rich phase in the presence of a transesterification catalyst. It has been observed that upon melt processing a polyester-polycarbonate copolymer wherein the polyester-polycarbonate copolymer contains substantial amounts of a long polyester subunit within the copolymer, as described above and without any added reagents or catalysts present, the polyester-rich subunits form a discrete phase, i.e. the polyester-rich subunits phase separates from the surrounding polycarbonate rich phase, to form phase separated regions. A phase separated region may be defined as a region within a surrounding matrix, having a discrete and observable boundary separating it from the surrounding matrix. These phase separated regions vary in dimension, but are generally elongated in the dimension of extrusion or injection molding, and may have a long dimension 20 to 200 nanometers in continuous length, coincident with the direction of flow of the thermoplastic composition during extrusion or injection molding. Thus, absent a mechanism to prevent, reduce, mitigates or eliminate the formation of these phase separated regions, they are observed to form where polyester-polycarbonates contain long polyester-rich subunits which phase separate from the polycarbonate rich phases or the total polyester-polycarbonate matrix, specifically where the polyester-polycarbonates contain polyester units derived from isophthaloyl and terephthaloyl esters of resorcinol, comprising greater than 25 mole percent polyester units relative to the polycarbonate units of the polyester-polycarbonate copolymer.

In a specific example of an embodiment, the weatherable polyester unit of the polyester-polycarbonate is an isophthalate-terephthalate resorcinol polyester unit. The formation of polycarbonate-immiscible polyester-containing regions may be observed by appropriate analytical methods such as transmission electron microscopy (TEM).

Without being bound by theory, it is believed that the presence of these phase separated regions in the combination leads to scattering of incident light. Increasing size of the phase separated regions, and increased numbers of phase separated regions are individually believed to correlate to increased scatter of incident light. Thus, smaller phase separated regions and decreased numbers of phase separated regions may decrease the amount of scattered incident light, and thereby decrease the measurable haze of the combination, and where desired, provide an increase in the light transmission.

Surprisingly, addition of small amounts of transesterification catalysts, also known as redistribution catalysts, typically used to redistribute the molecular weight distribution of polycarbonates by catalyzing chain scission reactions, can substantially eliminate the formation of these phase separated regions in highly immiscible blends of polyester-polycarbonates with polycarbonates. As used herein, the term "substantially eliminate" means eliminating formation of phase-separated regions such that phase separated regions are not observed using methods described herein. It is believed that catalytically-induced exchange of carbonate groups across the interphase boundary between the phase separated polyester-polycarbonate-containing regions and surrounding polycarbonate matrix compatibilizes the polymers by forming polymer chain links that span the interphase boundary, thereby substantially eliminating these phase-separated regions. It is further believed that elimination of these phase-separated regions provides a thermoplastic composition having very low scattering of incident light, and hence low haze.

Suitable transesterification catalysts are numerous and include a wide variety of bases and Lewis acids. Specific examples of some transesterification catalysts, i.e. those which produce lower molecular weight species, efficient transesterification, and low residual monomer, include tetraorganophosphonium hydroxides, tetraorganophosphonium carbonates, tetraorganophosphonium acetate, tetraorganophosphonium phenolates, tetraorganophosphonium bisphenolates, tetraalkyl ammonium hydroxides, tetraalkyl ammonium carbonates, tetraalkyl ammonium phosphites, tetraalkyl ammonium acetates, tetraalkyl ammonium phenolates, tetraalkyl ammonium bisphenolates, and a mixture comprising one or more of these. More specifically, the transesterification catalyst may be a tetra $C_1$-$C_{10}$ alkyl phosphonium hydroxide that is decomposable under reaction conditions to very low levels of the active catalytic species. Most specifically, the catalyst may be tetrabutylphosphonium hydroxide (TBPH).

Transesterification catalysts may be present in amounts of greater than 0.002% to 0.1%, or from greater than 20 to 1000 ppm of the total weight of the polymer blend. In one embodiment, the amount of transesterification catalyst present in the polyester-polycarbonate and polycarbonate blend is 40 to 220 ppm, specifically 50 to 200 ppm, more specifically 60 to 180 ppm of the total weight of the polyester-polycarbonate- and polycarbonate. In another embodiment, the amount of transesterification catalyst present in the polyester-polycarbonate blend is 40 to 220 ppm, specifically 50 to 200 ppm, more specifically 60 to 180 ppm of the total weight of the polyester-polycarbonate. In a specific embodiment, the transesterification catalyst is tetrabutylphosphonium hydroxide (TBPH). The transesterification catalyst is present in sufficient amount to catalyze the reaction to a sufficient amount to produce a transparent reaction product, but is not present in an excessive amount, because an excess of catalyst may produce an opaque reaction product and/or a non-weatherable reaction product. The optimal catalyst level will vary depending on the particular catalyst and can be determined by testing.

Accordingly, a reaction product of a polyester-polycarbonate copolymer and a polycarbonate polymer in the presence of a transesterification catalyst, as described above, is substantially free of phase separated regions. The reaction product has a low degree of scatter of incident light, and correspondingly a low or very low measurable haze level. Additionally, a reaction product of a polyester-polycarbonate copolymer, which the polyester subunit has enough repeat units to phase separate from the polyester-polycarbonate matrix into a polyester-rich domain, in the presence of a low level of a transesterification catalyst, as described above, is substantially free of phase separated regions. The reaction product has a low degree of scatter of incident light, and correspondingly a low or very low measurable haze level.

In an embodiment, the reaction product has a haze of less than 5.0%, specifically less than or equal to 3.5%, and more specifically less than or equal to 1.7%, measured at a thickness of 3.2 mm according to ASTM D1003-00. Reaction products having low or very low haze can have high optical clarity and/or excellent surface finish. The polyester-polycarbonate and polycarbonate used herein are selected such that, in the absence of the transesterification catalyst, the combination of the polyester-polycarbonate and polycarbonate would have a haze of greater than 1.7% measured at a thickness of 3.2 mm according to ASTM D 1003-00.

In another embodiment, the reaction product has a haze of less than 5.0%, specifically less than or equal to 3.5%, measured at a thickness of 3.2 mm according to ASTM D1003-00. Reaction products having low or very low haze can have high optical clarity and/or excellent surface finish. The polyester-polycarbonate copolymer composition used herein is selected such that, in the absence of the transesterification catalyst, the melt-processed polyester-polycarbonate would have a haze of greater than 3.5% measured at a thickness of 3.2 mm according to ASTM D1003-00. The reaction product of the polyester-polycarbonate and the transesterification catalyst is transparent, substantially one phase (as measured by TEM at 37,000× magnification), and has a shorter block length of r units than the reaction product of a polyester-polycarbonate without a transesterification catalyst.

As discussed hereinabove, transesterification catalysts can catalyze exchange between carbonate units in the polyester-polycarbonate and polycarbonate. In an embodiment, where the polyester-polycarbonate comprises carbonate units of formula (1) comprising resorcinols, in which the hydroxy groups are substituted 1,3, and where there are carbonate units also present, comprising dihydroxy aromatic compounds comprising formula (4), referred to as bisphenol A carbonate units, it has been observed using NMR spectroscopy that the resorcinol based carbonate units exchange more rapidly than the bisphenol A carbonate units.

Control of the concentration of transesterification catalyst has been observed to inversely affect the number of moles of resorcinol carbonate units, which may be present in the polyester-polycarbonate. It is believed that cross exchange of resorcinol carbonate units with bisphenol A carbonate units is favored relative to the exchange of resorcinol carbonate units with other resorcinol carbonate units, and thus there is a net reduction in resorcinol carbonate units present in the reaction product. Resorcinol hydroxy polymer chain end groups may also be forned due to hydrolysis or trans-esterification events. It has been observed using phosphorus-31 ($^{31}P$) NMR that the resorcinol-OH polymer chain end groups form 1.5 times more frequently than bisphenol-A-OH polymer chain end groups during exchange.

While carbonate unit exchange as catalyzed by the transesterification catalyst is favored, ester units can also undergo exchange with both resorcinol carbonate units and bisphenol A carbonate units. It has been observed that side reactions to form ester units of formula (10) can be minimized by controlling the concentration of transesterification catalyst present in the formulation. In an embodiment, an amount of transesterification catalyst is used that is of sufficiently high concentration to effect exchange of carbonate units between the polyester-polycarbonate rich and polycarbonate rich phases, and low enough to minimize the side reactions which cause formation of ester units of formula (10) that result from the transesterification of carboxylate esters of the polyester with the hydroxy aromatic groups of the polycarbonate. An acceptable molar number of ester units of formula (10) so formed, which provide acceptable weatherability in the reaction product, is less than or equal to 5%, specifically less than or equal to 4.5%, more specifically less than or equal to 4% of the total number of moles of ester units present in the reaction product. In a specific embodiment, where the polycarbonate comprises bisphenol A polycarbonate, less than or equal to 5% of the ester units in the reaction product are bisphenol-A-ester units formed by transesterification. A suitable technique for determining the relative number of moles of ester units includes nuclear magnetic resonance (NMR) spectrometry, specifically the methods of proton ($^1H$) NMR, carbon ($^{13}C$) NMR, or a combination of these methods.

In addition to the reaction product of the polyester-polycarbonate, polycarbonate, and transesterification catalyst, or the reaction product of the polyester-polycarbonate and the transesterification catalyst, the thermoplastic composition may include various polymers and/or additives ordinarily incorporated in resin compositions of this type, with the proviso that the additives are preferably selected so as to not significantly adversely affect at least one of the desired properties of the reaction product. Mixtures of additives may be used. Such additives may be mixed at a suitable time during the mixing of the components for forming the thermoplastic composition. Specifically, where used, additives which may have acidic functionality that can react with the transesterification catalyst and so affect its reactivity are combined with the reaction product post-reaction. The removal of additives from a thermoplastic composition thus provides the reaction product possessing its desired properties.

Other thermoplastic polymers, for example polyesters, may be included in the thermoplastic composition. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition. Use of blends of polyesters with the reaction product of polyester-polycarbonate-polycarbonate and a transesterification catalyst, or the reaction product of a polyester-polycarbonate and a transesterification catalyst, is possible where the presence of the polyester does not adversely affect at least one desirable property of the reaction product, such as, but not limited to, weatherability, haze, impact strength, and the like.

Where desired, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., from about 0.5 to about 10 percent by weight, of units derived from an aliphatic diacid and/or an aliphatic polyol to make copolyesters. Polyesters, where used, are generally present in amounts of about 0.5 to about 70 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise a polysiloxane-polycarbonate copolymer. The polydiorganosiloxane blocks of the copolymer comprise repeating polydiorganosiloxane units of formula (12):

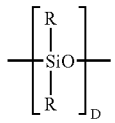
(12)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. The foregoing groups may be fully or partially halogenated with fluorine, chlorine, bromine, or iodine, or a combination thereof. Combinations of the foregoing R groups may be used in the same copolymer.

The value of D in formula (12) may vary widely depending on the type and relative amount of each component in the thermoplastic composition, the desired properties of the composition, and like-considerations. Generally, D may have an average value of 2 to 1,000, specifically 2 to 500, more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (13):

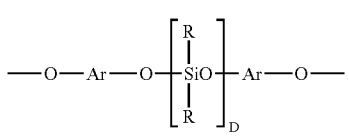
(13)

wherein D is as defined above; each R may be the same or different, and is as defined above; and each Ar may be the same or different, and is a substituted or unsubsubstituted $C_6$-$C_{30}$ arylene radical, wherein the bonds are directly connected to an aromatic moiety. Suitable Ar groups in formula (13) may be derived from a $C_6$-$C_{30}$ dihydroxy aromatic compound, for example a dihydroxy aromatic compound of formula (3), (4), or (7) above. Combinations comprising at least one of the foregoing dihydroxy aromatic compounds may also be used. Specific examples of suitable dihydroxy aromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl) cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of formula (14):

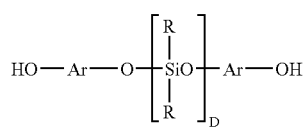
(14)

wherein R, Ar, and D are as described above. Compounds of formula (14) may be obtained by the reaction of a dihydroxy aromatic compound with, for example, an alpha, omega-bisacetoxypolydiorangonosiloxane under phase transfer conditions.

In another embodiment, polydiorganosiloxane blocks comprises units of formula (15):

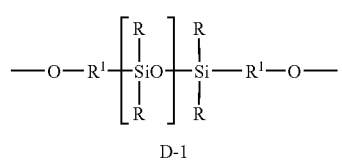
(15)

wherein R and D are as described above, and each occurrence of $R^1$ is independently a divalent $C_1$-$C_{30}$ organic radical, and wherein the polymerized polysiloxane unit is the reaction residue of its corresponding dihydroxy compound. In a specific embodiment, the polydiorganosiloxane blocks are provided by repeating structural units of formula (16)

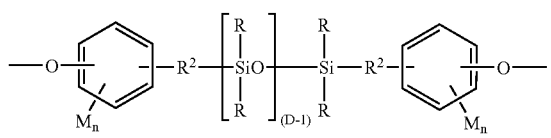
(16)

wherein R and D are as defined above. Each $R^2$ in formula (16) is a divalent $C_2$-$C_8$ aliphatic group. Each M in formula (16) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trim-ethylene or tetramethylene group; and R is a $C_1$-$C_8$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (16) may be derived from the corresponding dihydroxy polydiorganosiloxane (17):

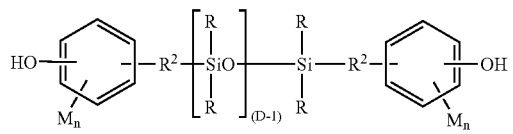

(17)

wherein R, D, M, $R^2$, and n are as described above. Such dihydroxy polysiloxanes can be made by effecting a platinum catalyzed addition between a siloxane hydride of formula (18):

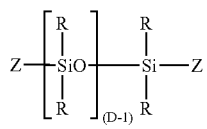

(18)

wherein R and D are as previously defined and Z is H, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used. A hydroxyaryl-terminated polysiloxane can also be prepared by the condensation of polysiloxane (18), wherein R and D are as previously defined and Z is acetoxy, or halogen such as, for example Cl, with a dihydroxy aromatic compound of formula (3), (4), or (7) as described above, and in either the presence or absence of a base or other catalyst. Specific suitable dihydroxy compounds for this purpose include, but are not limited to, 1,1-bis(4-hydroxyphenyl)methane, 1,1-bis(4-hydroxyphenyl)ethane, bisphenol A, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl) propane. Combinations comprising at least one of the foregoing dihydroxy compounds may also be used.

The polysiloxane-polycarbonate comprises 50 to 99 wt % of carbonate units and 1 to 50 wt % dimethylsiloxane units, or the molar equivalent of other diorganosiloxane units. Within this range, the polysiloxane-polycarbonate copolymer may comprise 70 to 98 wt %, specifically 75 to 97 wt % of carbonate units and 2 to 30 wt %, specifically 3 to 25 wt % dimethylsiloxane units, or the molar equivalent of other diorganosiloxane units.

The polysiloxane-polycarbonate copolymer may have a light transmission greater than or equal to 55%, specifically greater than or equal to 60% and more specifically greater than or equal to 70%, as measured according to ASTM D1003-00. The copolymer may have a haze less than or equal to 30%, specifically less than or equal to 25%, and most specifically less than or equal to 20%, as measured according to ASTM D1003-00.

In one specific embodiment, the polysiloxane-polycarbonate comprises polysiloxane units and carbonate units derived from bisphenol A, in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography as described above.

In one embodiment, the polysiloxane-polycarbonate has a melt volume flow rate (often abbreviated MVR), measured at 300° C./1.2 kg, of 1 to 35 grams per 10 minutes (g/10 min), specifically 2 to 30 g/10 min. Mixtures of polysiloxane-polycarbonates of different flow properties may be used to achieve the overall desired flow property.

Polysiloxane-polycarbonates, where used, are generally present in amounts of about 0.5 to about 70 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further include an impact modifier composition comprising a particular combination of impact modifiers to increase its impact resistance. These impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (19):

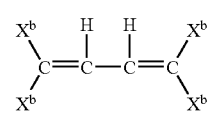

(19)

wherein each $X^b$ is independently hydrogen, $C_1$-$C_5$ alkyl, or the like. Examples of conjugated diene monomers that may be used are butadiene, isoprene, 1,3-heptadiene, methyl-1, 3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (20):

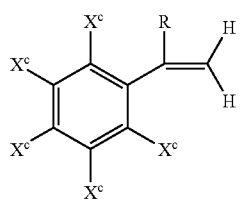
(20)

wherein each $X^c$ is independently hydrogen, $C_1$-$C_{12}$ allkyl, $C_3$-$C_{12}$ cycloalkyl, $C_6$-$C_{12}$ aryl, $C_7$-$C_{12}$ aralkyl, $C_7$-$C_{12}$ alkaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (21):

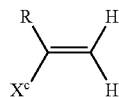
(21)

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (21) include acrylonitrile, ethacrylonitrile, methacrylonitrile, alpha-chloroacrylonitrile, beta-chloroacrylonitrile, alpha-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth) acrylate, 2-ethylhexyl(meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt. % of comonomers of formulas (19), (20), or (21). Exemplary comonomers include but are not limited to butadiene, isoprene, styrene, methyl methacrylate, phenyl methacrylate, penethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. Particle size may be measured by simple light transmission methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70%. Also suitable are mixtures of butadiene with styrene and/or $C_{4-6}$ alkyl acrylate rubbers.

The elastomeric phase may provide about 5 to about 95 wt. % of the total graft copolymer, more specifically about 20 to about 90 wt. %, and even more specifically about 40 to about 85 wt. % of the elastoiner-miodified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (20) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (21). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include acrylonitrile, ethacrylonitrile, methacrylonitrile, methyl(meth)acrylate, ethyl(meth)acrylate, n-propyl(meth)

acrylate, isopropyl(meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may (generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise about 40 to about 95 wt. % elastomer-modified graft copolymer and about 5 to about 65 wt. % graft (co)polymer, based on the total weight of the impact modifier. In another embodiment, such impact modifiers comprise about 50 to about 85 wt. %, more specifically about 75 to about 85 wt. % rubber-modified graft copolymer, together with about 15 to about 50 wt. %, more specifically about 15 to about 25 wt. % graft (co) polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane., octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable alkenyl-containing organic material may be, for example, a monomer of formula (20) or (21), e.g., styrene, alpha-methylstyrene, acrylonitrile, methacrylonitrile, or an Linbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl)(dimethoxy) methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment the foregoing types of impact modifiers are prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

A specific impact modifier of this type is an MBS impact modifier wherein the butadiene substrate is prepared using above-described sulfonates, sulfates, or phosphates as surfactants. It is also preferred that the impact modifier have a pH of about 3 to about 8, specifically about 4, to about 7. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). Impact modifiers, where used, are generally present in amounts of about 0.5 to about 50 percent by weight, based on 100 percent by weight of the reaction product of the polyester-polycarbonate, polycarbonate, and transesterification, or the reaction product of the polyester-polycarbonate and transesterification catalyst.

The thermoplastic composition may further comprise fillers. Suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as TiO$_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze. zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising, at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers forned from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers, where used, are generally present in amounts of about 0 to about 90 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise antioxidant additives. Suitable antioxidant additives include, for example, organophosphites such as tris(nonyl phenyl) phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise heat stabilizers. Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise light stabilizers and/or ultraviolet light (UV) absorbing additives. Where used, suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 percent by weight, based on 100 percent by weight of the reaction product of the polyester-polycarbonate, polycarbonate, and transesterification catalyst, or the reaction product of the polyester-polycarbonate and transesterification catalyst.

Suitable UV absorbing additives include for example, hydroxybenzophenones; hydroxybenzotriazones; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of 0.0001 to about 1 percent by weight, based on 100 percent by weight of the reaction product of the polyester-polycarbonate, polycarbonate, and transesterification catalyst, or the reaction product of the polyester-polycarbonate and transesterification catalyst.

Plasticizers, lubricants, and/or mold release agents additives may also be used in the thermoplastic composition. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials are generally used in amounts of 0.0001 to 1 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise an antistatic agent. The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamiides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat™ 6321 (Sanyo) or Pebax™ MH1657 (Atofina), Irgastat™ P18 and P22 (Ciba-Geigy). Other polymeric materials that may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents are generally used in amounts of 0.0001 to 5 percent by weight, based on 100 percent by weight of the reaction product of the polyester-polycarbonate, polycarbonate, and transesterification catalyst, or the reaction product of the polyester-polycarbonate and transesterification catalyst.

Colorants such as pigment and/or dye additives may also be present in the thermoplastic composition. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like: carbon blacks; zinc ferrites; ultramarine blue; Pigment Brown 24; Pigment Red 101: Pigment Yellow 119; organic pigments such as azos, di-azos, quinacridones, perylenes, naphthalene tetracarboxylic acids, flavanthrones, isoindolinones, tetrachloroisolindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of 0.01 to 10 percent by weight, based on 100 percent by weight of the reaction product of the polyester-polycarbonate, polycarbonate, and transesterification catalyst, or the reaction product of the polyester-polycarbonate and transesterification catalyst.

Suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes: arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoLlnmarin; 3-(2'-benzothiazolyl)-7-diethylaminocoumarin; 2-(4-biphenylyl)-5-(4-t-butylphienyl)-1,3,4-oxadiazole; 2,5-bis-(4-biphenylyl)-oxazole; 2,2'-dimethyl-p-quaterphenyl; 2,2-diimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-diimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Dyes are generally used in amounts of 0.01 to 10 percent by weight, based on 100 percent by weight of the reaction product of the polyester-polycarbonate, polycarbonate, and transesterification catalyst, or the reaction product of the polyester-polycarbonate and transesterification catalyst.

The thermoplastic composition may further comprise flame retardants. Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each C is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable arormatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

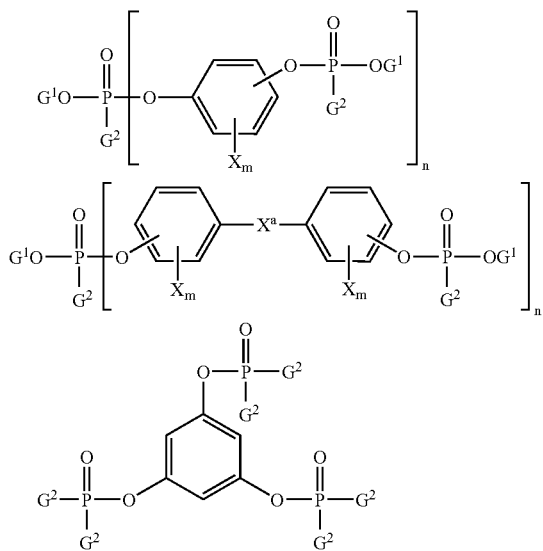

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Examples of suitable di- or polyfunctional aromatic phosphorus-containing compounds include resorcinol tetraphenyl diphosphate (RDP), the bis (diphenyl)phosphate of hydroquinone and the bis(diphenyl) phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides. phosphinic acid amides, tris(aziridinyl) phosphine oxide. When present, phiosphorus-containing flame retardants are generally present in amounts of 0.1 to 5 percent by weight, based on 100 percent by weight of the reaction product of the polyester-polycarbonate, polycarbonate, and transesterification catalyst, or the reaction product of the polyester-polycarbonate and transesterification catalyst.

Halogenated materials may also be used as flame retardants, for example halogenated compounds and resins having formula (22):

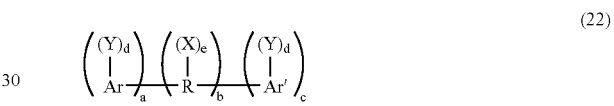

(22)

wherein R is an alkylene, alkylidene or cycloalipliatic linkage, e.g., methylene, ethylene, propylene, isopropylene, isopropylidene, butylene, isobutylene, amylene, cyclohexylene, cyclopentylidene, or the like; or an oxyg,en ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (22) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; or ether groups of the general formula OE, wherein E is a monovalent hydrocarbon radical similar to X; or monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally present in amounts of 0.1 to 10 percent by weight, based on 100 percent by weight of the reaction product of the polyester-polycarbonate, polycarbonate, and transesterification catalyst, or the reaction product of the polyester-polycarbonate and transesterification catalyst.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium pertiuorohexane sulfonate, and potassium diphenylsulfone sulfonate, and the like: salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of 0.1 to 5 percent by weight, based on 100 percent by weight of the reaction product of the polyester-polycarbonate, polycarbonate, and transesterification catalyst, or the reaction product of the polyester-polycarbonate and transesterification catalyst.

Anti-drip agents may also be used in the thermoplastic composition, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN nay provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method nay be used to produce an encapsulated fluoropolymer. Antidrip agents are generally used in amounts of 0.1 to 5 percent by weight, based on 100 percent by weight of the reaction product of the polyester-polycarbonate, polycarbonate, and transesterification catalyst, or the reaction product of the polyester-polycarbonate and transesterification catalyst.

Radiation stabilizers may also be present in the thermoplastic composition, specifically gamma-radiation stabilizers. Suitable gamma-radiation stabilizers include diols, such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,2-cyclopentanediol, 1,2-cyclohexanediol, and the like; branched acyclic diols such as 2,3-dimethyl-2,3-butanediol (pinacol), and the like, and polyols, as well as alkoxy-substituted cyclic or acyclic alkanes. Alkenols, with sites of unsaturation, are also a useful class of alcohols, examples of which include 4-methyl-4-penten-2-ol, 3-methyl-pentene-3-ol, 2-methyl-4-penten-2-ol, 2,4-dimethyl-4-pene-2-ol, and 9-decen-1-ol. Another class of suitable alcohols is the tertiary alcohols, which have at least one hydroxy substituted tertiary carbon. Examples of these include 2-methyl-2,4-pentanediol(hexylene glycol), 2-phenyl-2-butanol, 3-hydroxy-3-methyl-2-butanone, 2-phenyl-2-butanol, and the like, and cycoloaliphatic tertiary carbons such as 1-hydroxy-1-methyl-cyclohexane. Another class of suitable alcohols is hydroxymethyl aromatics, which have hydroxy substitution on a saturated carbon attached to an unsaturated carbon in an aromatic ring. The hydroxy substituted saturated carbon may be a methylol group ($—CH_2OH$) or it may be a member of a more complex hydrocarbon group such as would be the case with ($—CR^4HOH$) or ($—CR_2^4OH$) wherein $R^4$ is a complex or a simply hydrocarbon. Specific hydroxy methyl aromatics may be benzhydrol, 1,3-benzenedimethanol, benzyl alcohol, 4-benzyloxy benzyl alcohol and benzyl benzyl alcohol. Specific alcohols are 2-methyl-2,4-pentanediol (also known as hexylene glycol), polyethylene glycol, polypropylene glycol. Gamma-radiation stabilizing compounds are typically used in amounts of 0.001 to 1 wt %, more specifically 0.01 to 0.5 wt %, based on the total weight of the reaction product of the polyester-polycarbonate, polycarbonate, and transesterification catalyst, or the reaction product of the polyester-polycarbonate and transesterification catalyst.

The thermoplastic compositions disclosed herein comprise the reaction product of a polyester-polycarbonate and a polycarbonate using a transesterification catalyst. The polyester-polycarbonate may be combined with the polycarbonate in proportions suitable to provide the desired properties of melt flow and ductility. The amount of transesterification catalyst is suitable to provide a balance of properties in the thermoplastic composition including haze, yellowness index, notched Izod impact strength, and melt flow.

In an embodiment, the thermoplastic composition comprises the reaction product of a polyester-polycarbonate and a polycarbonate in a weight ratio of 10:90 to 90:10, specifically 15:85 to 85:15, more specifically 20:80 to 80:20, and a transesterification catalyst at levels of 40 to 220 ppm, specifically 50 to 200 ppm, more specifically 60 to 180 ppm relative to the weight of the polyester-polycarbonate and polycarbonate polymers used. In another embodiment, the thermoplastic composition consists essentially of the reaction product of a polyester-polycarbonate and a polycarbonate in a weight ratio of 10:90 to 90:10. specifically 15:85 to 85:15, more specifically 20:80 to 80:20, and a transesterification catalyst at levels of 40 to 220 ppm, specifically 50 to 200 ppm, more specifically 60 to 180 ppm relative to the weight of the polyester-polycarbonate and polycarbonate polymers used. In another embodiment, the thermoplastic composition consists of the reaction product of a polyester-polycarbonate and a polycarbonate in a weight ratio of 10:90 to 90:10, specifically 15:85 to 85:15, more specifically 20:80 to 80:20, and a transesterification catalyst at levels of 40 to 220 ppm, specifically 50 to 200 ppm, more specifically 60 to 180 ppm relative to the weight of the polyester-polycarbonate and polycarbonate polymers used. All of the foregoing values are based on the combined weight of the polyester-polycarbonate, the polycarbonate, and the transesterification catalyst, exclusive of other polymers, additives or fillers, unless otherwise specified, and the combined weight percentage of all specified components may not exceed 100 wt %.

The thermoplastic compositions disclosed herein further comprise the reaction product of a polyester-polycarbonate using a transesterification catalyst. The amount of transesterification catalyst is suitable to provide a balance of properties in the thermoplastic composition including haze, yellowness index, notched Izod impact strength, and melt flow.

In a specific embodiment the reaction product comprises a combination comprising 10 to 90 wt % of a polyester-polycarbonate comprising repeating ester units of formula (23):

wherein the molar ratio of isophthalate units u to terephthalate units v is 91:9 to 2:98, more specifically 85:15 to 3:97, and repeatable polycarbonate units of formulas (24) and (25):

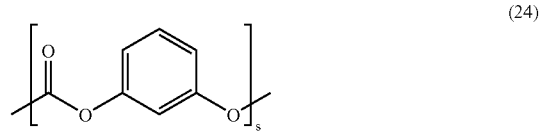

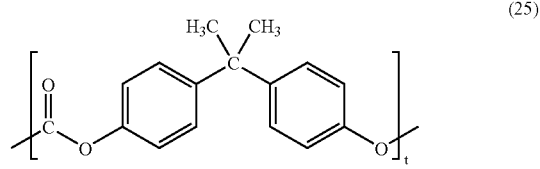

wherein the mole % r of the repeating ester unit (23) is 25 to 75 mole %, specifically 30 to 69 mole %, the mole % s of the repeatable carbonate unit (24) is o to 50 mole %, specifically 1 to 40 mole %, and the mole % t of the repeatable carbonate unit (25) is 25 to 75 mole %, specifically 30 to 70 mole %, wherein r+s+t equals 100 mole %. It should be noted that the structure of the repeatable carbonate units of formulas (24) and (25) have been modified so as to reflect the connectivity of the carbonate units with the other copolymer units. The combination also comprises 90 to 10 wt % of a polycarbonate comprising repeatable carbonate unit (25); and a transesterification catalyst present at 40 to 220 ppm, based on the total weight of the polyester-polycarbonate and polycarbonate polymers. The reaction product has a haze of less than or equal to 1.7%, measured at a thickness of 3.2 millimeters according to ASTM D1003-00. In an embodiment, a thermoplastic composition comprises the above reaction product.

In another embodiment, the reaction product comprises a combination comprising 100 wt % of a polyester-polycarbonate comprising repeating ester units of formula (23):

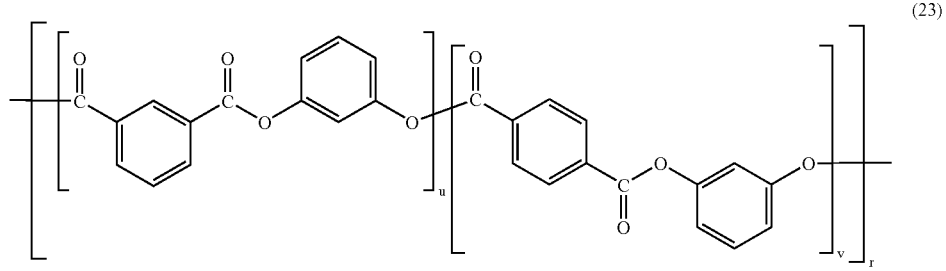

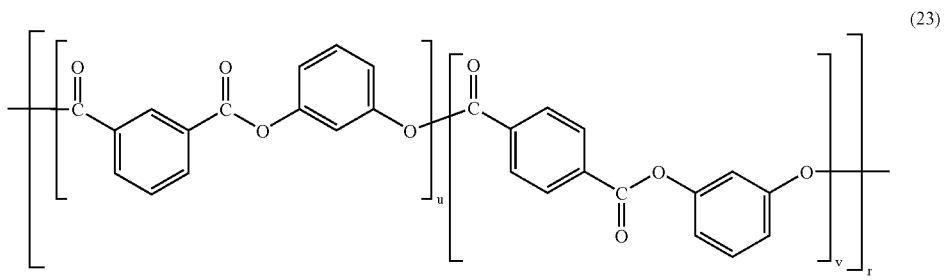
(23)

wherein the molar ratio of isophthalate units u to terephthlalate units v is 91:9 to 2:98, more specifically 85:15 to 3:97, and repeatable polycarbonate units of formulas (24) and (25):

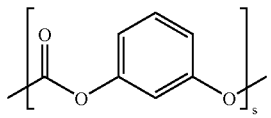
(24)

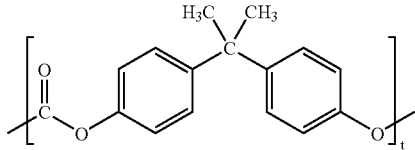
(25)

wherein the mole % r of the repeating ester unit (23) is 5 to 95 mole %, specifically 10 to 90 mole %, the mole % s of the repeatable carbonate unit (24) is 1 to 25 mole %, specifically 2 to 20 mole %, and the mole % t of the repeatable carbonate unit (25) is 95 to 5 mole %, specifically 90 to 10 mole %, wherein r+s+t equals 100 mole %. It should be noted that the structure of the repeatable carbonate in its of formulas (24) and (25) have been modified so as to reflect the connectivity of the carbonate units with the other copolymer units. The combination also comprises a transesterification catalyst present at 40 to 220 ppm, based on the total weight of the polyester-polycarbonate copolymer. The reaction product is transparent. In an embodiment, a thermoplastic composition comprises the above reaction product.

The thermoplastic compositions may be manufactured by methods generally available in the art wherein the combination of copolymers, including the individual compositions of the copolymers, the specific catalyst, the relative amounts of these, and the reaction conditions (e.g., heat input, dispersion) are selected such that the method produces a homogeneous combination. For example, in one embodiment, in one manner of proceeding, powdered polyesterpolycarbonate, powdered polycarbonate, and/or other optional components are first combined in a Henschel™ high speed mixer. Other low shear processes including but not limited to hand mixing may also accomplish this blending. The blend is then fed into the throat or feedthroat of an extruder via a hopper. Alternatively, one or more of the components may be incorporated into the composition by feeding directly into the extruder at the throat and/or downstream through a sidestuffer or feedport. Such additives may also be compounded into a masterbatch (i.e., a concentrate of the additive in a component polymer) with a desired polymeric resin and fed into the extruder. The extruder is generally operated at a temperature higher than that necessary to cause the composition to flow. The catalyst is also fed as an aqueous solution concomitantly down the throat of the extruder. The catalyst may be fed using a metering pump or by a calibrated gravity fed drip. The catalyst may also be blended with the polyester-polycarbonate and polycarbonate powders (or the polyester-polycarbonate) in a mixer prior to extrusion. The catalyst may be diluted in water fromn a concentration of 50 to 1 wt % catalyst in water. The extrudate is immediately quenched in a water batch (typically filled with pure deionized low conductivity water) and pelletized (specifically in as clean and particulate free environment as practical). The pellets, as prepared when cutting the extrudate, may be one-fourthi inch long or less as desired and may include be of a variety of shapes, from ellipsoid to circular in cross section. Such pellets may be used for subsequent extruding, molding, shaping, or forming. It is also generally known to be desirable to have as low a degree of fines (smaller particulates) as possible.

Other embodiments include articles comprising any of the above-described compositions. For example, the article may comprise a film, sheet, molded object, membrane, or composite, wherein the film, sheet, molded object, or composite has at least one layer comprising the composition. Compositions of the invention may be made into articles using common thermoplastic processes such as film and sheet extrusion, injection molding, gas-assist injection molding, extrusion molding, compression molding, blow molding, and the like. Film and sheet extrusion processes may include melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultraviolet light resistance, aesthetic appeal, lubricity, and biocompatibility. Coatings may be applied through standard application techniques such as rolling spraying, dipping, brushing, or flow-coating. Film and sheet of the invention may alternatively be prepared by casting a solution or suspension of the composition in a suitable solvent onto a substrate, belt, or roll followed by removal of the solvent.

Oriented films may be prepared through blown film extrusion or by stretching cast or calendared films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as follows: (a.) Providing a single or multi-layer thermoplastic substrate having optionally one or more colors on the surface, for instance, using screen printing or a transfer dye; (b.) Conforming the substrate to a mold configuration such as by forming and trimming a substrate into a three dimensional shape and fitting the substrate into a mold having a surface which matches the three dimensional shape of the substrate; (c.) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including but not limited to heat-setting, texturing, embossing, corona treatment, flame treatment, plasma treatment and vacuum deposition may further be applied to the above articles to alter surface appearances and impart additional functionalities to the articles.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, medical devices, membrane devices, and components of lighting fixtures, ornaments, home appliances, roofs, greenhouses, sun rooms, swimming pool enclosures, and the like. Other representative weatherable articles that may be fabricated using the thermoplastic compositions provided herein include aircraft, automotive, truck, military vehicle (including automotive, aircraft, and water-borne vehicles), and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and device; enclosures for electrical and telecommunication devices: outdoor furniture; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; optical lenses; ophthalmic lenses; corrective ophthalmic lenses; implantable ophthalmic lenses; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; (coated helmets and personal protective equipment; coated synthetic or natural textiles; coated photographic film and photographic prints; coated painted articles; coated dyed articles; coated fluorescent articles; coated foam articles; and like applications. Additional fabrication operations may be performed on articles, such as, but not limited to molding, in-mold decoration, baking in a paint oven, lamination, and/or thermoforming.

In one embodiment, the thermoplastic composition (or articles prepared therefrom) may exhibit one or more of the following desirable properties: a percent transmission of at least 70%, more specifically at least 80%, measured at a thickness of 3.2 mm according to ASTM D1003-00; a melt volume ratio (MVR) of 1 to 40, more specifically 2 to 25 g/10 minutes, measured at 300° C. and 1.2 kg in accordance with ISO 1133. The thermoplastic composition may further have a heat deformation temperature (HDT) of 110 to 170° C., more specifically 120 to 160° C., measured at 66 psi according to ISO 179, and a notched Izod impact strength of 4 to 18 foot pounds/inch (ft-lb/in), more specifically at least 5 to 16 ft-lb/in, measured according to ASTM D256-04 at 23° C. The polycarbonate compositions may further have a % tensile elongation of 30 to 120%, or specifically 60 to 115%, measured in accordance with ASTM D256-04. Further, the thermoplastic compositions have a yellowness index (YI) of less than or equal to 30, specifically less than or equal to 25, more specifically less than or equal to 20, as measured according to ASTM D1925 on 3.18 mm thick test specimens.

The thermoplastic composition is further illustrated by the following non-limiting examples, which use the following components.

Polymers used in preparing the examples include polyester-polycarbonate I (also referred to as PEC);

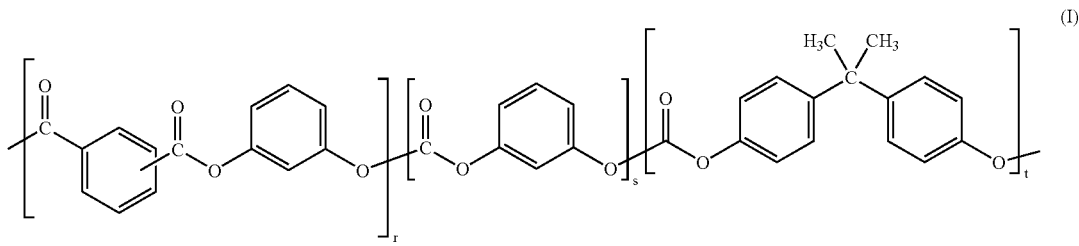

wherein the isomeric composition of polyester unit r is 50 mole % isophthalate-resorcinol and 50 mole % terephthalate-resorcinol, and wherein the mole-% of polyester unit r, resorcinol-carbonate unit s, and bisphenol A carbonate unit t, or r:s:t, of the compositions used is 51:15:34 and 81:11:8, respectively; and polycarbonate II based on bisphenol A carbonate units;

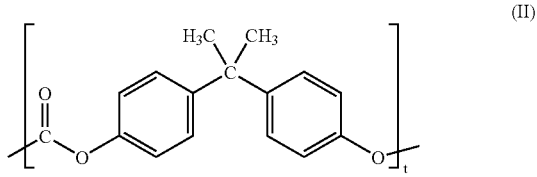

wherein the weight averaged molecular weight is either 29.9 Kg/mol or 23.3 Kg/mol, as determined by gel permeation chromatography (GPC) using a crosslinked styrene-divinylbenzene column set, a sample concentration of about 0.1% by weight in methylene chloride as eluent and toluene as internal flow marker at a flow rate of 1.5 ml/min. Transesterification catalysts, as used herein are either 20 or 40 weight percent (wt %) aqueous solutions of either tetrabutylphosphonium hydroxide (TBPH), diethyl dimethyl ammonium hydroxide (DEDMAH), sodium hydroxide, or sodium stearate at loadings of 80 or 160 ppm unless otherwise noted, based on the weight of polymer components (I) and (II).

All thermoplastic compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on a Husky or BOY injection molding machine. Compositions are compounded and molded at a temperature of 285 to 330° C., though it will be recognized by one skilled in the art that the method may not be limited to these temperatures.

The thermoplastic compositions are tested for the following properties: Haze (%) was determined according to ASTM D1003-00 using a Gardner Haze Guard Dual, on 3.2 or 1.6 millimeter thick molded plaques. Izod Notched impact strength and % ductility were measured according to ISO 180 on 4 and 3.12 millimeter thick test bars and at various temperatures (see ASTM D256-04 for NI testing at 23° C.), and converting to Joules per centimeter (J/cm) by multiplying the value obtained in foot-pound per inch by 0.534 J/cm per ft-lb/in. Melt Volume rate, also referred to herein as melt flow rate, MVR, was tested according to ISO 1133 at 300° C. for 6 and 18 minutes using a weight of 1.2 kilograms (see also ASTM 1238-04). Heat deformation temperature (HDT) was determined on one-eighth inch (3.12 mm) bars at 66 psi according to ISO 179. Yellowness Index (YI) for laboratory scale samples was measured in accordance with ASTM D1925-70.

EXAMPLE 1

The following formulation was blended and extruded on a twin-screw extruder: (A) I, where r:s:t is approximately 51:15:34 (2500 g); (B) II, $M_w$=29.9 kg/mol (2500 g); (C) tetrabutylphosphonium hydroxide (1.0 g of a 40 wt % solution in water, for 80 ppm of catalyst).

EXAMPLE 2

The following formulation was blended and extruded on a twin-screw extruder: (A) I, where r:s:t is approximately 51:15:34 (2500 g); (B) II $M_w$=29.9 kg/mol (2500 g); (C) tetrabutylphosphonium hydroxide (1.0 g of a 40 wt % solution in water, for 80 ppm catalyst based on I and II), (D) phosphite stabilizer (5.0 g), (E) titanium dioxide (500 g).

EXAMPLE 3

The following formnulation was blended and extruded on a twin-screw extruder: (A) I, where r:s:t is approximately 51:15:34 (2500 g); (B) II $M_w$=29.9 kg/mol (2500 g); (C) tetrabutylphosphonium hydroxide (1.0 g of a 40 wt % solution in water, for 80 ppm catalyst); (D) phosphite stabilizer (1.5 g).

EXAMPLE 4

The following formulation was blended and extruded on a twin-screw extruder: (A) I, where r:s:t is approximately 51:15:34 (2500 g); (B) II, $M_w$=29.9 kg/mol (2500 g); (C) tetrabutylphosphonium hydroxide (2.0 g of a 40 wt % solution in water, for 160 ppm catalyst).

EXAMPLE 5

The following formulation was blended and extruded on a twin-screw extruder: (A) I, where r:s:t is approximately 51:15:34 (2500 g); (B) II, $M_w$=21.8 kg/mol (2500 g); (C) tetrabutylphosphonium hydroxide (1.0 g of a 40 wt % solution in water, for 80 ppm catalyst).

EXAMPLE 6

The following formulation was blended and extruded on a twin-screw extruder: (A) I, where r:s:t is approximately 51:15:34 (2000 g); (B) I, where r:s:t is approximately 81:11:8 (500 g); (C) II, Mw=29.9 kg/mol (2500 g) (D)

tetrabutylphosphonium hydroxide (2.0 g of a 40 wt % solution in water, for 160 ppm catalyst).

EXAMPLE 7

The following formulation was blended and extruded on a twin-screw extruder: (A) I, where r:s:t is approximately 51:15:34 (1250 g); (B) I, where r:s:t is approximately 81:11:8 (1250 g); (C) II, $M_w$=29.9 kg/mol (2500 g) (D) tetrabutylphosphonium hydroxide (2.0 g of a 40 wt % solution in water, for 160 ppm catalyst).

EXAMPLE 8

The following formulation was blended and extruded on a single-screw extruder: (A) I, where r:s:t is approximately 51:15:34 (2500 g); (B) II, $M_w$=29.9 kg/mol (2500 g); (C) tetrabutylphosphonium ihydroxide (2.0 g of a 40 wt % solution in water, for 160 ppm of catalyst).

COMPARATIVE EXAMPLE 1

The following formulation was blended and extruded on a twin-screw extruder: (A) I, where r:s:t is approximately 51:15:34 (2500 g); (B) II, Mw=29.9 kg/mol (2500 g).

COMPARATIVE EXAMPLE 2

The following formulation was blended and extruded on a twin-screw extruder: (A) I, where r:s:t is approximately 51:15:34 (2500 g); (B) II Mw=21.8 kg/mol (2500 g).

COMPARATIVE EXAMPLE 3

The following forinulation was blended and extruded on a twin-screw extruder: (A) I, where r:s:t is approximately 51:15:34 (2500 g); (B) II, $M_w$=21.8 kg/mol (2500 g); (C) sodium stearate (1.0 g, for 200 ppm sodium stearate catalyst).

COMPARATIVE EXAMPLE 4

The following formulation was blended and extruded on a twin-screw extruder: (A) I, where r:s:t is approximately 51:15:34 (2500 g); (B) II, Mw=21.8 kg/mol (2500 g); (C) sodium hydroxide (1.0 g, for 200 ppm catalyst).

COMPARATIVE EXAMPLE 5

The following formulation was blended and extruded on a twin-screw extruder: (A) I, where r:s:t is approximately 51:15:34 (1000 g); (B) II Mw=29.9 kg/mol (1000 g); (C) tetrabutylphosphonium hydroxide (0.1 g of a 40 wt % solution in water, for 20 ppm catalyst).

COMPARATIVE EXAMPLE 6

The following, formulation was blended and extruded on a single-screw extruder: (A) I, where r:s:t is approximately 51:15:34 (1000 g); (B) II $M_w$=29.9 kg/mol (1000 g); (C) tetrabutylphosphonium hydroxide (0.4 g of a 40 wt % solution in water, for 80 ppm catalyst).

COMPARATIVE EXAMPLE 7

The following formulation was blended and extruded on a single-screw extruder: (A) I, where r:s:t is approximately 51:15:34 (2500 g); (B) II, $M_w$=29.9 kg/mol (2500 g); (C) tetrabutylphosphonium hydroxide (1.0 g of a 40 wt % solution in water, for 80 ppm of catalyst).

COMPARATIVE EXAMPLE 8

The following formulation was blended and extruded on a single-screw extruder: (A) I, where r:s:t is approximately 51:15:34 (2500 g); (B) II, $M_w$=29.9 kg/mol (2500 g); (C) diethyiditnethylammonium hydroxide (4.0 g of a 20 wt % solution in water, for 160 ppm of catalyst).

COMPARATIVE EXAMPLE 9

The following formulation was blended and extruded on a single-screw extruder: (A) I, where r:s:t is approximately 51:15:34 (2500 g); (B) II, Mw=29.9 kg/mol (2500 g); (C) diethyldimethylammonium hydroxide (2.0 g of a 20 wt % solution in water, for 80 ppm of catalyst).

COMPARATIVE EXAMPLE 10

The following formulation was blended and extruded on a twin-screw extruder: (A) I, where r:s:t is approximately 51:15:34 (2500 g); (B) II, Mw=29.9 kg/mol (2500 g); (C) diethyldimethylammonium hydroxide (4.0 g of a 20 wt % solution in water, for 160 ppm of catalyst).

Properties of Examples 1, 3, 6, 7 and Comparative Examples 1, 5, 6. Table 1 shows optical and mechanical data for blends and copolymers of I and II. From the haze data, it can be seen that addition of transesterification catalyst renders immiscible polymer materials I and II miscible with haze values of 1% or less. The use of the transesterification catalyst causes an increase in the melt flow rate (MVR) of 33-48%, and a marked reduction in the viscosity stability after extended heating at 300° C. Heat distortion temperature (HDT) is unaffected while notched Izod impact is moderately decreased by 8-28% with the use of transesterification catalysts.

TABLE 1

|  | Ex. 1 | Ex. 3 | Ex. 6 | Ex. 7 | Comp Ex. 1 | Comp. Ex. 5 | Comp. Ex. 6 |
|---|---|---|---|---|---|---|---|
| Haze (%) | 0.9 | 0.9 | 0.9 | 1 | 100 | 100 | 100 |
| MVR (g/10 min) | 14.4 | 12.9 | 13.9 | 13.4 | 9.7 | N/A | N/A |
| % Viscosity change (300° C./30 min) | −4.7 | −4.3 | −0.8 | −1.8 | −16 | N/A | N/A |
| HDT at 66 psi (° C.) | 132.6 | N/A | 133.9 | 133.9 | 133.7 | N/A | N/A |
| Notched Izod Impact at 23° C. (J/cm) | 6.49 | N/A | 7.74 | 8.12 | 9.05 | N/A | N/A |

Properties of Example 5 and Comparative Examples 2-4. Thermoplastic compositions of polymers I and II were made in which the weight averaged molecular weight (Mw) of II was varied and different basic transesterification catalysts were used. The results are shown in Table 2. Addition of basic transesterification catalysts caused the haze of the polymer blend to decrease (Ex 5, Comparative Example's 3 and 4) relative to the uncatalyzed blend (Comparative Example 2) due to an increase in the compatibilization of the two immiscible polymeric phases. However, in Comparative Examples 3 and 4, the yellowness index (YI) and melt flow increased due to the high reactivity of the catalysts used. The physical properties were also adversely affected by degradation of the molecular weight. By comparison, Example 5 showed a relatively low YI and low % haze, while maintaining good heat performance, melt stability and impact strength.

TABLE 2

|  | Ex. 5 | Comp. Ex. 2 | Comp. Ex. 3 | Comp. Ex. 4 |
|---|---|---|---|---|
| Haze (%) | 1 | 100 | 1.8 | 3 |
| Yellowness Index (YI) | 9.8 | 40.5 | 55.9 | 93.8 |
| MVR (g/10 min) | 22.8 | 16.4 | 96 | N/A |
| Tg (° C.) | 142 | 142 | 135 | 136 |
| % Viscosity Loss (300° C./30 min) | −7% | −24% | N/A | N/A |
| Notched Izod Impact at 23° C. (J/cm) | 5.71 | 9.18 | 0.13 | 0.15 |
| Notched Izod Impact at 0° C. (J/cm) | 1.71 | 0.80 | N/A | N/A |

Effects of Catalyst Type and Extruder Design (Single or Twin Screw). A non-phosphonium redistribution catalyst, diethyld i methylammonuim hydroxide (DEDMAH), was compared with tetrabutylphosphonilin hydroxide (TBPH) in the preparation of blends of I and II using both twin-screw and single screw extrusion system. The results are shown in Table 3.

TABLE 3

|  | Ex. 8 | Comp. Ex. 7 | Comp. Ex. 8 | Comp. Ex. 9 | Comp. Ex. 10 |
|---|---|---|---|---|---|
| % Haze | 1.1 | 2.9 | 76.6 | 92.8 | 1.7 |
| MVR (g/10 min.) | 8.54 | 7.6 | 8.24 | 7.07 | 9.88 |
| % Viscosity Loss (300° C./30 min.) | −2.5 | −4.2 | −9.6 | −8.1 | −2.6 |
| Tg (° C.) | 147 | 148 | 142 | 147 | 146 |
| Notched Izod at 23° C. (ft-lbs/in) | 9.13 | 9.18 | 8.97 | 9.51 | 9.45 |

The data for Comparative Example 10 shows that the use of DEDMAH as a transesterification catalyst, using twin screw extrusion gave a transparent copolymer (haze=1.7). A similar loading of TBPH catalyst in Example 8 provides a lower haze value of 1.1% using a much less efficient single screw extruder. Thermal and impact properties are similar.

The difference in reactivity of TBPH and DEDMAH is highlighted in the data for the thermoplastic compositions prepared in Example 8 and Comparative Examples 7-9, each of which was extruded using a single-screw extruder. The haze values at 160 ppm catalyst loading for the TBPH-catalyzed mixture of Example 8 was 1.1%, compared with the haze value for the DEDMAH-catalyzed mixture of Comparative Example 8 which is 76.6% (nearly an opaque material). This indicates a lower reactivity of DEDMAH which, when combined with the less efficient mixing achieved using a single screw extruder, leads to differences in the inicrostructure of the thermoplastic composition, compared with TBPH catalyst at equivalent loadings.

The relationship between extruder type (single or twin screw) and reactivity of TBPH and DEDMAH is further highlighted in the data for the thermoplastic compositions prepared in Example 1, 4, and 8 and Comparative Examples 1, 8 and 10. Example 8 and Comparative Example 8 were each extruded using single-screw extrusion, while the rest were extruded using twin screw extrusion. Table 4 summarizes reaction conditions and optical and structural information for these thermoplastic compositions.

TABLE 4

|  | Ex. 1 | Ex. 4 | Ex. 8 | Comp. Ex. 1 | Comp. Ex. 8 | Comp. Ex. 10 |
|---|---|---|---|---|---|---|
| Extruder | TS | TS | SS | TS | SS | TS |
| Catalyst | TBPH | TBPH | TBPH | — | DEDMAH | DEDMAH |
| Catalyst Loading (ppm) | 80 | 160 | 160 | 0 | 80 | 160 |
| % BPA-PE units formed (NMR) | 2.1 | 4.4 | 2.8 | 0 | 1.9 | 1.7 |
| Haze | 0.9 | 0.9 | 1.1 | 100 | 76.6 | 1.7 |

Twin screw extrusion using DEDMAH at 160 ppm catalyst loading (Comparative Example 10) nearly achieves the desired haze values that are obtained with TBPH, at similar catalyst loadings. Single screw extrusion of TBPH and DEDMAH samples at the same catalyst loading (Example 8, and Comparative Example 8, respectively) shows a substantial difference in haze. Thus, DEDMAH does not provide the desired performance under both sets of mixing conditions.

Nuclear Magnetic Resonance spectroscopy ($^1$H and $^{13}$C NMR) data show that the percentage of bisphenol-A ester units (% BPA-PE in Table 4) indicate that, in general, fewer than 3% of the resorcinol ester units of 1 (r of the ratio r:s:t) exchange with bisphenol carbonate units of II in a side reaction to form BPA-PE units of formula (10), except in Example 4 wherein the combined conditions of higher catalyst loadings (160 ppm), more efficient catalyst (TBPH) and more efficient mixing (twin screw extrusion) give a higher % BPE-PE. The % BPA-PE increases by 0.4% when TBPH is used (Example 4) instead of DEDMAH (Comparative Example 10), using a twin-screw extruder and at the same catalyst loading; however, TBPH provides a lower haze value of 0.9% compared with 1.7% for DEDMAH. Further, for a single catalyst loading, the more efficient mixing method of twin screw extrusion (Example 4) results in comparatively higher levels of BPA-PE than for the single screw extrusion (Example 8).

Further, increasing catalyst concentration has an inverse effect on the relative amounts of resorcinol carbonate groups (repeat unit s of the ratio r:s:t) of polyester-polycarbonate I. $^{31}$p and $^{13}$C NMR data generally indicated a 1.5 fold increase in reactivity at the resorcinol carbonate linkage compared to the BPA carbonate linkage. This resulted in the preferential formation of polymer chain resorcinol OH end groups.

TEM Analysis. Transmission electron microscopy (TEM) imaging of the thermoplastic composition prepared using TBPH catalyst, and the thermoplastic composition prepared without catalyst was performed to compare morphological features of the extruded materials. Samples for TEM observation were prepared by cutting, blocking and facing of samples on a Leica UCT ultramicrotome. Final microtomy of 100 nm sections was performed at room temperature on the Leica UCT. The sections were stained with RuO4 solution for 2 min. The samples were viewed at 37,000× magnification.

FIG. 1 shows a TEM image of blends of I and II without TBPH catalyst (from Comparative Example 1), and FIG. 2 shows a TEM image of the blend with added TBPH (from Example 1). The TEM images were derived from samples taken from an injection molded plaque. In each figure, a photograph is inserted which shows the injection molded plaque covering the word "opaque" (FIG. 1) or "clear" (FIG. 2), written in black marker on a white piece of paper.

The TEM image in FIG. 1 shows distinct phases present as light and dark regions in the image, wherein the light-colored phase is the polyester-polycarbonate I, and the dark-colored phase is polycarbonate II. The polyester-polycarbonate phase is elongated along the direction of extrusion. In the photographic insert in FIG. 1, the word "opaque", as written on the piece of paper behind the injection molded plaque from Comparative Example 1, is barely visible, indicating high haze and low light transmission for the blend of I and II, and therefore is a visual indication of an incompatible system. The TEM image shown in FIG. 2 is uniform in appearance, with no discernable differences that would indicate formation of discrete phases. In the photographic insert in FIG. 2, the word "clear", as written underneath the injection-molded plaque from Example 1, and is easily seen in the picture, indicating the high degree of miscibility and transparency of the copolymer of I and II. Thus, simple blending of I and II, where I has an ester content >25 mole % creates a relatively opaque material due to the phase separation between the polyester and polycarbonate regimes. However, by the addition of TBPH, a reaction takes place in the extruder, which causes compatibilization between the two otherwise immiscible phases.

The thermoplastic composition is further illustrated by the additional following non-limiting examples, which use the following components.

Polymers used in preparing the examples include polyester-polycarbonate I (also referred to as PEC);

In some cases, a new polyester repeat unit III, based on Bisphenol A-arylate blocks, was formed during the transesterification:

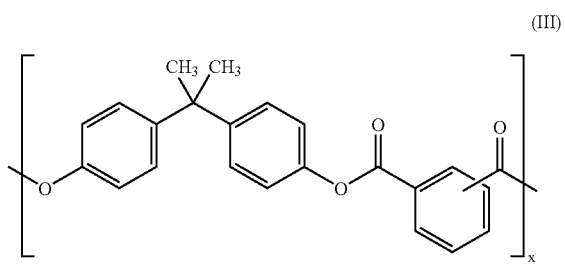

(III)

wherein x is the mole % of Bisphenol A-arylate units in the polyester. Without being bound by theory, it is believed that structure III may help compatibilize the immiscible phases of the polyester-polycarbonate copolymner and the long polyester subunits within the copolymer.

All thermoplastic compositions except where indicated are compounded on a Werner & Pfleiderer co-rotating twin screw extruder (Length/Diameter (LID) ratio=30/1, vacuum port located near die face). The twin-screw extruder had enough distributive and dispersive mixing elements to produce good mixing between the polymer compositions. The coinpositions are subsequently molded according to ISO 294 on a Husky or BOY injection molding machine. Compositions are compounded and molded at a temperature of 285 to 330° C., though it will be recognized by one skilled in the art that the method may not be limited to these temperatures.

The thermoplastic compositions are tested for the following properties: Haze (%) was determined according to ASTM D1003-00 using a Gretag MacBeth Instrument, on 3.2 millimeter thick molded plaques. Melt Volume rate, also referred to herein as melt flow rate, MVR, was tested

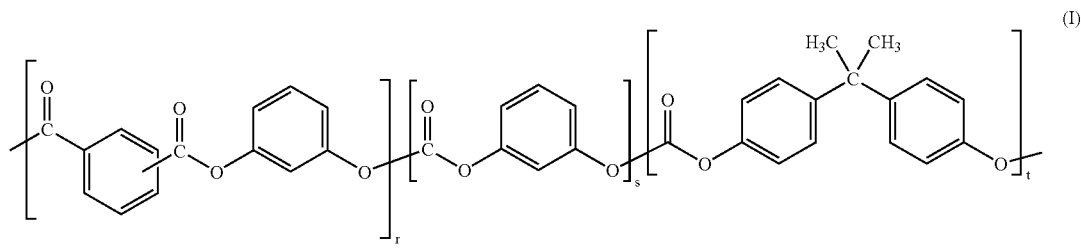

(I)

wherein the isomeric composition of polyester unit r is 50 mole % isophthalate-resorcinol and 50 mole % terephthalate-resorcinol, and wherein the mole % of polyester unit r, resorcinol-carbonate unit s, and bisphenol A carbonate unit t, or r:s:t, of the compositions used is 38:6:56. Transesterification catalysts, as used herein, are 10 weight percent (wt %) aqueous solutions of tetrabutylphosphonium hydroxide (TBPH), at a loading of 80 ppm unless otherwise noted, based on the weight of polymer components (I).

according to ASTM 1238-04 at 300° C. for 6 and 18 minutes using a weight of 1.2 kilograms.

EXAMPLE 9

The following formulation was blended and extruded on a single screw extruder: (A) 1, where r:s:t is approximately 38:6:56 (2000 g); (B) tetrabutylphosphonium hydroxide (1.6 g of a 10 wt % solution in water, for 80 ppm of catalyst).

COMPARATIVE EXAMPLE 11

The following formulation was blended and extruded on a single-screw extruder: (A) I, where r:s:t is approximately 38:6:56 (2000 g).

Properties of Polyester-polycarbonate of Formula I with elevated polyester block length. A polyester-polycarbonate of Formula I with elevated polyester block length was extruded with and without a transesterification catalyst in a twin-screw extruder. The polyester-polycarbonate with the higher polyester block length (r) was translucent and hazy when extruded and injection molded (Comparative Example 11) without a transesterification catalyst. When a small amount (160 ppm) of TBPH was added to the same polyester-polycarbonate starting material, the polyester block length (r) was significantly reduced and redistributed (Example 9). The results are shown in Table 5.

TABLE 5

| | Comp. Ex. 11 | Ex. 9 |
|---|---|---|
| Appearance | Translucent, pearlescent | Transparent |
| 'r' block length | 25.7 | 7.6 |
| % x groups | 0.9 | 3.3 |
| MVR (g/10 min.) | 11.8 | 16.4 |
| Catalyst ppm (TBPH) | 0 | 160 |

TEM Analysis. Transmission electron microscopy (TEM) imaging of the thermoplastic composition prepared using TBPH catalyst, and the thermoplastic composition prepared without catalyst was performed to compare morphological features of the extruded materials. Samples for TEM observation were prepared by cutting, blocking and facing of samples on a Leica UCT ultramicrotome. Final microtomy of 100 nm sections was performed at room temperature on the Leica UCT. The sections were stained with $RuO_4$ solution for 2 min. The samples were viewed at 37,000× magnification.

Figure 4:
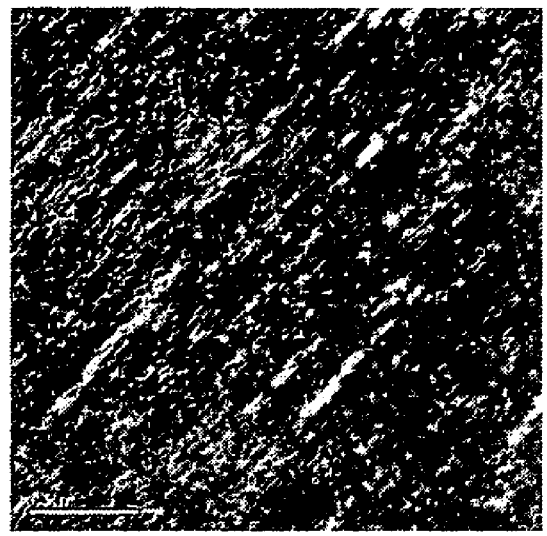
FIG. 4 is a TEM image of a polyester-polycarbonate composition with a transesterification catalyst present.

The TEM image in FIG. 4 shows distinct phases present as light and dark regions in the image, wherein the light-colored phase is the dispersed polyester phase, and the dark-colored phase is the polycarbonate matrix. The TEM image shown in FIG. 3 is uniform in appearance, with no discernable differences that would indicate formation of discrete phases. Thus, simple blending and extruding of a polymer of Formula I without a transesterification catalyst creates a relatively translucent, pearlescent material due to the phase separation between the polyester and polycarbonate regimes. However, by the addition of TBPH, a reaction takes place in the extruder, which causes compatibilization between the two otherwise immiscible phases.

The singular forms "a," "an," and "the" include plural referents unless the context clearly dictates otherwise. The endpoints of all ranges reciting the same characteristic or referring to the quantity of the same component are independently combinable and inclusive of the recited endpoint. All references are incorporated herein by reference. Further, it should be noted that the terms "first," "second," and the like herein do not denote any order, quantity, or importance, but rather are used to distinguish one element from another.

"Optional" or "optionally" means that the subsequently described event or circumstance may or may not occur, or that the subsequently defined element or ingredient may or may not be present and that the description includes instances where the event occurs and instances where it does not.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

What is claimed is:

1. A reaction product obtained by melt blending a combination comprising:
   a polymer comprising
   aromatic ester units of formula

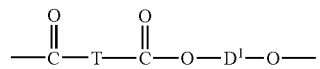

wherein T is a divalent aromatic radical and $D^1$ is a divalent aromatic radical, and
   carbonate units of formula

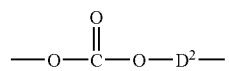

wherein at least 60% of the total number of $D^2$ groups are divalent aromatic radicals and the balance thereof are divalent aliphatic, alicyclic, or aromatic radicals; and
   a transesterification catalyst,
   wherein the reaction product has a haze of less than 5.0% measured at a thickness of 3.2 mm according to ASTM D1003-00; and wherein the polymer is selected such that, in the absence of the transesterification catalyst, the similarly melt blended combination has a haze of greater than 5.0% measured at a thickness of 3.2 mm according to ASTM D1003-00.

2. The reaction product of claim 1, wherein the polymer further comprises a second carbonate unit, and wherein the second carbonate unit is a resorcinol carbonate unit.

3. The reaction product of claim 1, wherein T is a residue of a mixture of isophthalic acid and terephthalic acid, and wherein each $D^1$ is independently a resorcinol.

4. The reaction product of claim 1, wherein the polymer comprises greater than or equal to 30 mole % aromatic ester units, and less than 70 mole % carbonate units.

5. The reaction product of claim 1, wherein the transesterification catalyst is a tetra $C_1$-$C_6$ alkyl phosphonium hydroxide, $C_1$-$C_6$ alkyl phosphonium phenoxide, or a combination comprising one or more of the foregoing catalysts.

6. The reaction product of claim 1, wherein the number of polyester repeat units (x) of Formula III

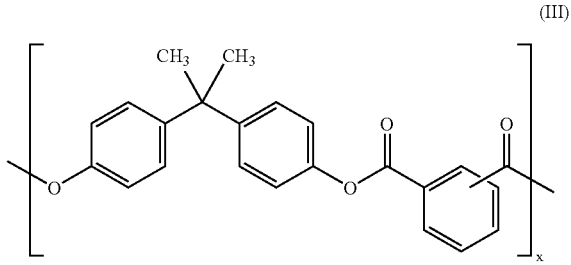

after melt blending is more than the number of polyester repeat units (x) of Formula III of a similarly melt blended combination without a transesterification catalyst.

7. The reaction product of claim 1, wherein the number of polyester repeat units (r) of Formula I

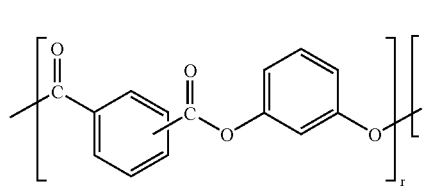

after melt blending is less than the number of polyester repeat units (r) of Formula I of a similarly melt blended combination without a transesterification catalyst.

8. The reaction product of claim 1, wherein the reaction product has a haze of less than 3.5% measured at a thickness of 3.2 mm according to ASTM D1003-00; and wherein the polymer is selected such that, in the absence of the transesterification catalyst, the similarly melt blended combination has a haze of greater than 3.5% measured at a thickness of 3.2 mm according to ASTM D1003-00.

9. A method for forming a reaction product, comprising melt blending a combination comprising:
a polymer comprising
aromatic ester units of formula

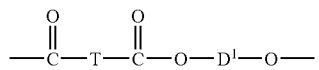

wherein T is a divalent aromatic radical and $D^1$ is a divalent aromatic radical, and
carbonate units of formula

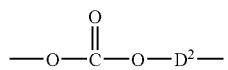

wherein at least 60% of the total number of $D^2$ groups are divalent aromatic radicals and the balance thereof are divalent aliphatic, alicyclic, or aromatic radicals; and
a transesterification catalyst,
to provide the reaction product with a haze of less than 5.0%, measured at a thickness of 3.2 mm according to ASTM D1003-00; and wherein the polymer is selected such that, in the absence of the transesterification catalyst, the similarly melt blended combination has a haze of greater than 5.0% measured at a thickness of 3.2 mm according to ASTM D1003-00.

10. The method of claim 8 wherein the transesterification catalyst is present in an amount of 40 to 220 ppm.

11. A reaction product made by the method of claim 8.

12. A thermoplastic composition comprising:
a reaction product obtained by melt blending a combination comprising:
a polymer comprising
aromatic ester units of formula

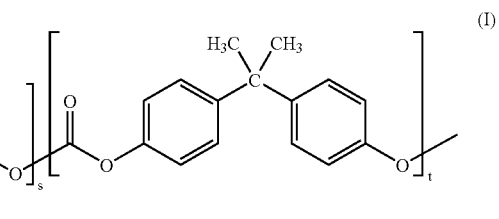

wherein T is a divalent aromatic radical and $D^1$ is a divalent aromatic radical, and
carbonate units of formula

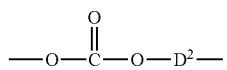

wherein at least 60% of the total number of $D^2$ groups are divalent aromatic radicals and the balance thereof are divalent aliphatic, alicyclic, or aromatic radicals; and
a transesterification catalyst,
wherein the reaction product has a haze of less than 5.0% measured at a thickness of 3.2 mm according to ASTM D1003-00; and wherein the polymer is selected such that, in the absence of the transesterification catalyst, the similarly melt blended combination has a haze of greater than 5.0% measured at a thickness of 3.2 mm according to ASTM D1003-00.

13. The thermoplastic composition of claim 12, wherein the reaction product has a haze of less than 3.5% measured at a thickness of 3.2 mm according to ASTM D1003-00; and wherein the polymer is selected such that, in the absence of the transesterification catalyst, the similarly melt blended combination has a haze of greater than 3.5% measured at a thickness of 3.2 mm according to ASTM D1003-00.

14. An article comprising the thermoplastic composition of claim 12.

15. The thermoplastic composition of claim 12, wherein the number of polyester repeat units (x) of Formula III

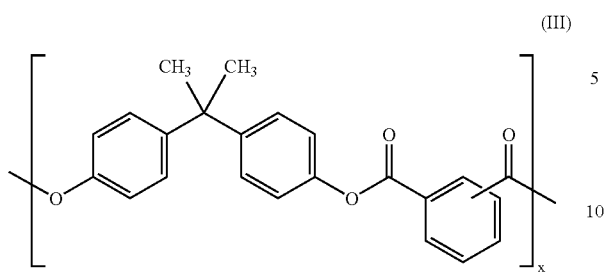

after melt blending is more than the number of polyester repeat units (x) of Formula III of a similarly melt blended combination without a transesterification catalyst.

16. The thermoplastic composition of claim 12, wherein the number of polyester repeat units (r) of Formula I

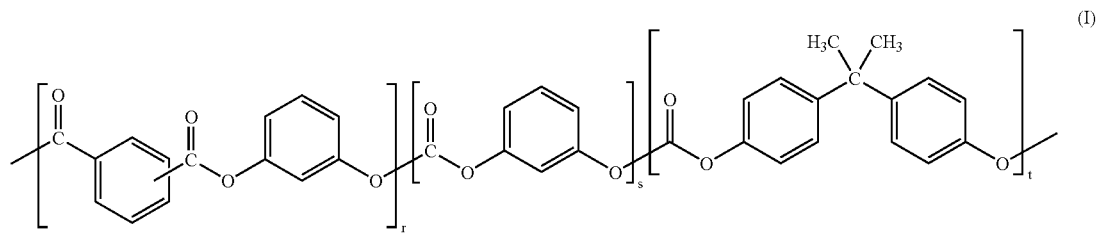

after melt blending is less than the number of polyester repeat units (r) of Formula I of a similarly melt blended combination without a transesterification catalyst.

17. The thermoplastic composition of claim 12, further comprising an additive selected from the group consisting of additional polymers, impact modifiers, fillers, reinforcing agents, thermal stabilizers, antioxidants, light stabilizers, gamma-irradiation stabilizers, plasticizers, colorants, antistatic agents, lubricants, mold releasing agents, flame retardants, anti-drip agents, and a combination comprising one or more of the foregoing additives.

18. The thermoplastic composition of claim 17, wherein the additional polymers comprise polyesters, polysiloxane-polycarbonates, or a combination comprising one or more of the foregoing polymers.

19. The thermoplastic composition of claim 17, wherein the reaction product separated from the additive has a haze of less than 3.5% at a thickness of 3.2 mm, according to ASTM D1003-00.

20. A reaction product obtained by melt blending a combination comprising:

a polymer comprising aromatic ester units of formula

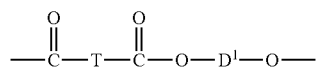

wherein T is a divalent aromatic radical and $D^1$ is a divalent aromatic radical, and carbonate units of formula

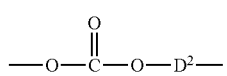

wherein at least 60% of the total number of $D^2$ groups are divalent aromatic radicals and the balance thereof are divalent aliphatic, alicyclic, or aromatic radicals; and a transesterification catalyst, wherein the number of polyester repeat units (x) of Formula III

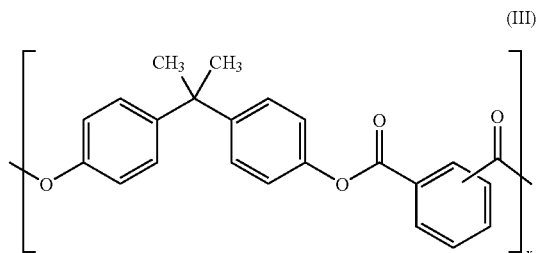

after melt blending is more than the number of polyester repeat units (x) of Formula III of a similarly melt blended combination without a transesterification catalyst.

21. The reaction product of claim 20, wherein the reaction product has a haze of less than 5.0% measured at a thickness of 3.2 mm according to ASTM D1003-00; and wherein the polymer is selected such that, in the absence of the transesterification catalyst, the similarly melt blended combination has a haze of greater than 5.0% measured at a thickness of 3.2 mm according to ASTM D1003-00.

22. The reaction product of claim 21, wherein the reaction product has a haze of less than 3.5% measured at a thickness of 3.2 mm according to ASTM D1003-00; and wherein the polymer is selected such that, in the absence of the transesterification catalyst, the similarly melt blended combination has a haze of greater than 3.5% measured at a thickness of 3.2 mm according to ASTM D1003-00.

23. The reaction product of claim 20, wherein the polymer comprises greater than or equal to 30 mole % aromatic ester units, and less than 70 mole % carbonate units.

24. The reaction product of claim 20, wherein the transesterification catalyst is present in an amount of 40 to 220 ppm.

25. The reaction product of claim 20, wherein the number of polyester repeat units (r) of Formula I

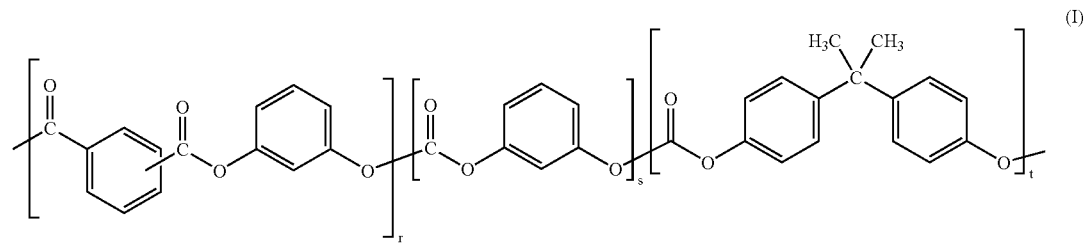

after melt blending is less than the number of polyester repeat units (r) of Formula I of a similarly melt blended combination without a transesterification catalyst.

* * * * *